June 21, 1949.  R. F. WYER  2,474,023
METHOD OF GAS-SHIELDED ALTERNATING
CURRENT ARC WELDING
Filed Feb. 17, 1944

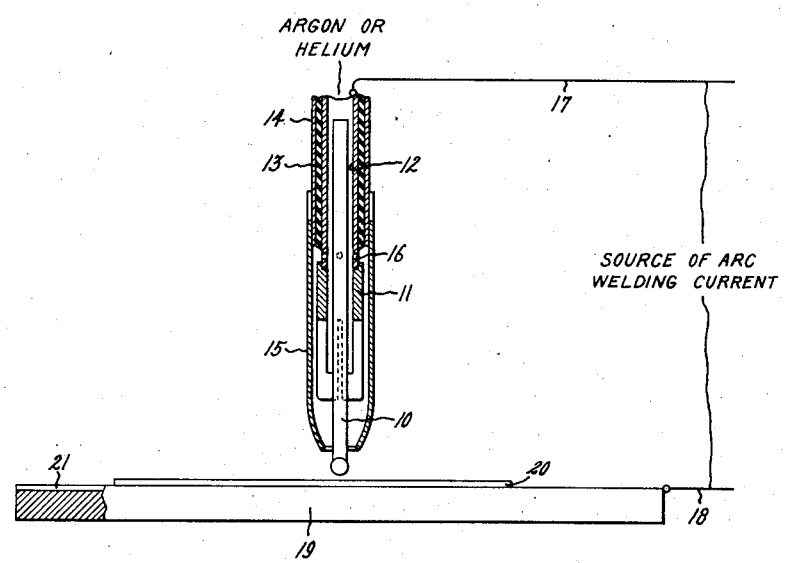

WHEN WELDING WITH AN ALTERNATING CURRENT ARC IN ARGON, USE OPEN CIRCUIT VOLTAGES GREATER THAN 145 VOLTS AND PREFERABLY GREATER THAN 200 VOLTS.

WHEN WELDING WITH AN ALTERNATING CURRENT ARC IN HELIUM, USE OPEN CIRCUIT VOLTAGES GREATER THAN 280 VOLTS AND PREFERABLY GREATER THAN 380 VOLTS.

Inventor:
Richard F. Wyer,
by Harry E. Dunham
His Attorney.

Patented June 21, 1949

2,474,023

UNITED STATES PATENT OFFICE 2,474,023

METHOD OF GAS-SHIELDED ALTERNATING CURRENT ARC WELDING

Richard F. Wyer, Rexford, N. Y., assignor to General Electric Company, a corporation of New York Application February 17, 1944, Serial No. 522,686

8 Claims. (Cl. 219—10)

My invention relates to the fusion and welding of metals in argon or helium by means of the electric arc, and more particularly to arc welding aluminum and its alloys in these gases.

Aluminum and its alloys are readily oxidized and, during an arc welding operation, the oxides formed make it impossible to obtain a satisfactory joint unless fluxes are employed to facilitate the formation of a weld by the mingling of the fused portions of the parts rendered molten by the arc. Thus, for example, even in an active reducing atmosphere such as atomic hydrogen, the presence of aluminum oxides makes it difficult to obtain a satisfactory weld unless suitable fluxes are used to overcome the effect of these oxides.

However, when using a flux, it is very difficult to obtain welds which are free from inclusion of flux or the slag resulting from the reaction of the flux with the aluminum oxide formed during the welding operation. Furthermore, the presence of a flux on the weld or the slag resulting therefrom makes it difficult for the operator to observe the welding operation he is performing.

In order to obviate the necessity of using fluxes, it has heretofore been proposed to conduct arc welding operations in shielding atmospheres of various gases. Thus in order to prevent the formation of oxides and nitrides in the weld metal and thereby produce ductile welds, it has been proposed to conduct the welding operation in absolutely inert shielding gases such as argon and helium. In these gases the direct current arc welding of ferrous metals such as steel and of a readily oxidized metal such as magnesium has proved to be quite effective. It would, consequently, appear that the same welding procedure might be applied to the arc welding of aluminum and its alloys.

I have discovered, however, that when arc welding aluminum and its alloys in shielding gases of argon or helium, it is necessary to follow a particular procedure in order to obtain satisfactory welding conditions.

It is, consequently, an object of my invention to arc weld aluminum and its alloys in shielding atmospheres of argon or helium in accordance with procedures I have discovered to be suitable for this purpose.

I have also discovered that in argon or helium, the alternating current welding arc established between an electrode and the work has a decided rectifier action productive of undesired welding conditions not only when working on aluminum but also when working on other metals. I have also discovered that when using sufficiently high open circuit voltages, these undesirable conditions can be mitigated or eliminated since at these higher voltages, the rectifier action of the arc is decreased.

It is, consequently, a more comprehensive object of my invention to establish procedures for fusing and welding metals with the alternating current arc in atmospheres of argon or helium.

Further objects of my invention will become apparent from the following description thereof.

In the accompanying drawing I have indicated the nature of my invention as applied to arc welding and have diagrammatically represented arc welding apparatus which may be used in practicing my invention.

In accordance with my invention as applied to the welding of aluminum, an arc is established between a substantially non-consumable metallic electrode and the work in a shielding atmosphere of argon or helium under certain conditions determined by the nature of the source of welding current supply. I prefer to use a tungsten electrode but have found that a thoriated tungsten or a tantalum electrode may be used. I have discovered that when welding aluminum with direct current the electrode must be connected to the positive terminal of the source of supply and that when welding aluminum with alternating current the open circuit voltage of the source must be greater than a predetermined value. When welding with alternating current in argon the open circuit voltage must be at least 145 volts and preferably greater than 200 volts. When welding with alternating current in helium the open circuit voltage must be at least as great as 280 volts and preferably greater than 380 volts.

As will be pointed out below, the high open circuit voltages found necessary when welding aluminum with an alternating current arc in argon and in helium will be productive of like desirable results when arc welding other metals.

I have found that when welding aluminum, the direct current arc can be used successfully in automatic welding where uniform conditions of arc gap and travel speed are readily established but that an alternating current arc is best suited for hand welding operations where it is difficult to maintain a uniform arc gap and travel speed.

When the aluminum weld is reinforced by feeding into the arc zone a strip of filler material such as aluminum wire, it is particularly desirable to use alternating current for hand welding operations. When welding with direct current the electrode, by reason of its connection to the positive terminal of the source of supply, becomes very hot and its tip is in most cases molten. With alternating current the electrode is only positive half of the time and is, consequently, not heated to as high a temperature. The higher temperature of the electrode when using direct current causes it to consume more readily than when using alternating current. Furthermore, if in hand welding the filler strip is accidentally brought into engagement with the electrode when using direct current, due to the higher operating temperature of the electrode, more of this filler material is fused off than would occur under like circumstances when using alternating current and the amount of material thus fused off onto the electrode when using direct current will frequently be great enough to run along the electrode and transfer the arc to the nozzle of the torch in which the electrode is supported. Furthermore, the presence of this molten aluminum on the electrode disrupts the uniformity of the welding operation by causing the arc to sputter until the molten aluminum on the electrode has been dissipated. While this is occurring, the uniformity of the weld bead is destroyed and black deposits form on the weld bead and the work adjacent thereto.

Furthermore, when welding with direct current the behavior of the arc is unpredictable due, no doubt, to arc blow resulting from the changing directions of current flow through the work and the effect of this welding current on any magnetic material in the vicinity of the arc. I have also noted that, with direct current, the cathode spot on aluminum work has a tendency to lag behind the electrode as it travels over the work. This in itself, independently of arc blow, may account for the erratic behavior of the arc when welding with direct current. By using alternating current, however, these disturbing influences are eliminated and better welding conditions are established in both automatic and hand welding operations.

I have found that when the open circuit voltage of an alternating current welding source is greater than 200 volts it is possible to obtain excellent welds in aluminum with an argon shielded arc established between a tungsten electrode and the work. Under such circumstances, the weld metal flows readily forming a bright bead having a smooth surface. The parent metal on each side of the bead is covered with a thin, narrow film of light gray material which during welding also precedes the crater formed in the work by the arc. The same desirable welding bead may be obtained with an alternating current open circuit voltage as low as 145 volts. However, there is a range of from about 145 volts to 200 volts where, depending upon circumstances not yet satisfactorily determined, the bright, well formed bead suitable for welding changes to a narrow groove or crater trace which is unsatisfactory for welding purposes. This crater trace may follow an irregular wave-like path along the work or may produce a regular pattern of loops such as would be produced by writing repeatedly the script letter *e*. This narrow crater trace has a black surface fringed by a thin black deposit formed on the work surface on each side thereof. It seems to have a surface film or skin which inhibits the formation of a bead of weld metal on the arcing surface of the work. However, due no doubt to the concentration of energy on the narrow band of this crater trace, the metal below its surface film is rendered molten to a greater depth than that obtained when the voltage is sufficient to cause this film or skin to break or be dispersed and the molten metal on the arcing surface of the work to flow together in the formation of a bright, smooth-surfaced bead. An alternating current source of voltage less than 145 volts will invariably cause this black crater trace which is unsuitable for welding aluminum.

When the alternating current open circuit voltage is varied from above 170 volts to below 145 volts, the bright well formed bead of weld metal will frequently have at voltages between 170 and 145 a slag-like surface coating which is of dark gray appearance. This surface film may also occur when the open circuit voltage of the alternating current source is greater than 200 volts and when using a direct current source of supply at low current values. This slag or dross-like coating can be removed from the bead with a wire brush and apparently in no way detracts from the satisfactory nature of the weld produced.

The production of a bright, well formed bead or the undesirable narrow black-surfaced groove seems to depend entirely on the open circuit voltage employed since it has been determined that with an alternating current source having an open circuit voltage of 67 volts, the arc current may be varied from 55 to 100 amperes without giving any indication that by these heavier current values the black crater trace can be changed over to the desirable bright, well formed bead of weld metal obtained at open circuit voltages greater than 145 volts.

With current flows suitable for establishing desired welding conditions, the arcing terminal of a tungsten electrode becomes molten forming a round ball-like terminal thereon. Apparently this ball is only molten on its surface for it does not wabble under the influence of gas flow or the action of magnetic fields on the current flow therethrough.

Substantially the same alternating current welding conditions above referred to are obtained when a thoriated tungsten electrode is substituted for a tungsten electrode. There is however, one quite distinct difference, namely, that the narrow crater groove, instead of being wavy and wandering irregularly over the surface of the work part, now becomes straight. When a tantalum electrode is substituted for a tungsten electrode under the conditions above described, the effect of the alternating current arc on the aluminum work part is substantially the same. However, due to the lower melting point of tantalum, the arcing tip of the electrode becomes quite fluid forming a mobile ball which wabbles continually during the welding operation. Consequently, the surface of the aluminum work part will have a bright bead or shallow black crater trace characterized by scalloped edges resulting from the irregular wabbling movement of the molten ball formed on the end of a tantalum electrode. At certain current values the molten ball on the end of a tantalum electrode may become so large as to fall therefrom onto the work, thus spoiling the welding operation.

I have noted that when the alternating current welding arc changes from a desirable welding characteristic to an undesirable welding characteristic depending on the open circuit voltage of the alternating current source of supply, the voltage of the arc will also change. Thus, for example, under desirable welding conditions a 55 ampered alternating current arc in argon between a tungsten or a thoriated tungsten electrode and a sheet of aluminum will have a voltage of from 13 to 15 volts when the arc gap at the beginning of the welding operation is about 40 mils. Under like conditions when using a tantalum electrode, the arc voltage will be about 15 volts. This is probably due to increased arc gap resulting from the larger ball of molten metal formed when using a tantalum electrode. However, with tungsten and thoriated tungsten electrodes, when the arc changes from that productive of a good weld to that productive of the undesired, narrow, black crater track, the voltage of the arc will increase to from about 27 to 32 volts and the welding current of the arc will also increase a slight amount, for example, from 55 amperes to about 60 amperes.

The above referred to alternating current values of arc voltage and arc current were obtained by using magnetic instruments of the type ordinarily used for determining root mean square values in alternating current measurements. It is to be understood that corresponding measurements given below were obtained in like manner. Likewise, hereinafter any reference to arc gap is the arc gap at the beginning of a welding operation. It is, of course, possible that during a welding operation this gap will increase due to consumption of the electrode unless the position of the electrode relative to the work is adjusted to compensate for this consumption.

When welding aluminum in a helium atmosphere, the arc established by an alternating current welding source behaves in much the same manner as an arc established in an argon atmosphere. However, the voltage above which good welds are obtained and the voltage range in which good and bad welds are obtained are different for helium than for argon.

As previously stated, when welding with alternating current in helium the open circuit voltage must be at least as great as 280 volts and preferably greater than 380. In contrast to welding in argon, the weld formed in helium has little or no fringe at its edges and its surface is not so bright as when welding in argon. If a fringe is formed, it is black and the surface of the weld will generally be coated with a very thin film that is copper brown in color. When, in helium, a slag-like deposit is formed on the bead, it is darker in color than the similar slag deposit formed when welding in an atmosphere of argon. Generally it is brownish gray in color.

As when welding in argon, a thoriated tungsten electrode in helium will give the above referred to straight line crater track and a tantalum electrode will have its arcing terminal rendered molten when the flow of helium gas about it and the arc is not too great. Since helium has a decided cooling effect on the electrode, high rates of flow of this gas will prevent the formation of a molten ball at the arcing terminal of a tantalum electrode. When a molten ball forms on the arcing terminal of a tantalum electrode, its behavior is the same as that experienced when welding in an atmosphere of argon.

In helium as in argon, when the alternating current welding arc changes from a desirable welding characteristic to an undesirable welding characteristic depending on the open circuit voltage of the source of supply, the voltage of the arc will also change. Thus, for example, under desirable welding conditions a 55 ampere arc in helium between a tungsten electrode and a sheet of aluminum will have a voltage of from 25 to 36 volts when the arc gap at the beginning of the welding operation is about 40 mils. However, when the arc changes from that productive of a good weld to that productive of the black crater track, the voltage of the arc will increase to from 60 to 80 volts and the welding current will also increase, for example, from 55 amperes to 80 amperes.

In view of what has been stated above, it is possible to make the following generalization, namely, that satisfactory conditions are established for arc welding in argon and in helium whenever the open circuit voltage of the alternating current source of supply is greater than that value above which the voltage of the arc for a predetermined arc gap is about half the value obtained when welding with open circuit voltages less than said value.

When welding aluminum with a direct current argon shielded arc established between a tungsten electrode and the work, I have found that it is necessary to operate with the electrode connected to the positive terminal of the source of supply.

If the electrode is connected to the negative terminal of a direct current source supply, a black deposit is formed on the weld and I have observed the following operating conditions. With open circuit voltages of about 66 volts, the arc wanders forming a wide weld having scalloped edges. If the open circuit voltage is increased to about 130 volts, the weld becomes narrower, weld penetration becomes greater, and the center of the weld on the surface of the bead toward the arc has a decided crease or groove like the crater track referred to above as occurring when welding with alternating current when the open circuit voltage is less than 145 volts. If the open circuit voltage of the direct current source is increased to say 260 volts, the center crease or crater track as well as the weld penetration increases. Irrespective of the amount of open circuit direct current voltage, the arc voltage for welding currents of from 50 to 60 amperes and an arc gap of about 40 mils is in each case about 10 volts. Although in each case when the electrode is connected to the negative terminal of the source of direct current supply, adequate fusion and an apparently satisfactory penetration is obtained, there is little tendency for the molten metal to flow to form a satisfactory weld bead on the arcing surface of the work. The surface deposit on the arc side of the bead seems to be responsible for this. It seems to form a scum or surface skin under which the metal becomes molten and produces the penetration noted.

When the polarity of the direct current source of welding current is changed so that the electrode is connected to its positive terminal, the surface of the fused metal on the arcing side of the work part becomes bright and the molten metal formed by the arc readily flows together forming an excellent weld. When the electrode is positive, good welding conditions are established at 66 open circuit volts and 55 amperes when welding aluminum sheets of .048" in thickness. There is, however, a slight discoloration along the center of the bead. With direct current open circuit voltages of 130 and 263 volts, and current values of 47 and 52 amperes, respectively, the surface of the weld bead is also bright and well formed by the intermingling of metal rendered molten by the arc. In these cases, however, there is a dark gray edge on the parent metal at each side of the weld. There is a trace of this same formation when welding at 66 open circuit volts direct current. Possibly the discoloration above referred to as being formed at 66 open circuit volts, is cleared from the weld and deposited at its edges when higher open circuit voltages are employed. When welding with the electrode connected to the positive terminal of a direct current source of supply, the arc in each of the cases above noted has a voltage of about 15 to 16 volts for the same gap which, when the electrode was connected to the negative terminal of the source of supply, produced a 10 volt arc.

When welding with a direct current arc and the electrode positive, the amount of current in the arc not only affects penetration as would be expected but also influences the surface of the weld. Thus, for example, at 65 open circuit volts and currents from 42 to 37 amperes, the welding bead has a bright surface. However, when the welding current is decreased to about 27 amperes, a dark gray band forms on the center of the arc side of the bead and at still lower currents the resulting condition is at most a surface melting of the work part extending along a band about twice the width of the bead formed at 42 to 37 amperes. At times this surface melt is bright with center bands of gray dross and at times it has a surface mottled by a dark gray dross. At the lower current values, the open circuit voltage varied from 49 to 27.5 volts as current flows varied from 27 to 7 amperes. The voltage of the arc for a 40 mil gap varied from 15 to 17.5 volts.

However, when the electrode is positive and the current at these lower open circuit direct current voltages is increased, good fusion and a bright bead are again obtained. Thus with open circuit voltages of 49 to 30 and current values of 41 to 46 amperes desired operating conditions are again established. Under these conditions the arc voltage for an arc gap of 40 mils is about 16. However, at 25 volts open circuit voltage and 30 to 40 amperes welding current the molten bead becomes discontinuous and the above referred to surface melting condition again appears.

When, with a direct current source of supply, a thoriated tungsten electrode is substituted for a tungsten electrode, substantially the same results as above described are obtained. Because of its low melting point, a tantalum electrode cannot be used when connected to the positive terminal of a direct current source of supply. Its terminal becomes molten forming a wabbly ball which invariably after a short period of operation fuses to the work and is thereafter deflected into engagement with the nozzle of the gas-arc torch as the torch travels over the work. When a tantalum electrode is connected to the negative terminal of a direct current source of supply, the operating temperature of the tantalum electrode is sufficiently low to prevent the formation of this wabbly ball, but the arc wanders and the work is coated with a black deopsit just as when welding with a tungsten electrode connected to the negative terminal of a direct current source of supply.

When welding aluminum with a helium shielded direct current arc, the results obtained are comparable to those above described for welding with an argon shielded direct current arc. However, it is not possible, with the electrode connected to the negative terminal of a direct current source of 65 open circuit volts, to strike and maintain an arc in helium between a tungsten electrode and an aluminum sheet. When a thoriated tungsten electrode is substituted for the tungsten electrode, the arc in helium is hard to start and, although very wild and erratic in its behavior, it can be maintained. Such an arc for a 40 mil gap has an operating voltage of about 21 volts. The aluminum is blackened on the arcing surface of the fused metal and has a grooved crater track just as when welding in argon.

When a thoriated tungsten electrode is connected to the positive terminal of a source of direct current supply having an open circuit voltage of 65 volts, a bead of molten metal with regular cooling ridges is readily formed. It is covered by a sooty black deposit having coppery brown coloration where the black deposit is thin. The greater the arc gap, the more pronounced are the cooling ridges on the surface of the bead. These cooling ridges are very small at gaps of from 20 to 30 mils when the arc current is about 48 amperes and the arc voltage about 23 volts.

When a tungsten electrode is connected to the positive terminal of a source of direct current supply having an open circuit voltage of 65 volts, the results are comparable to those noted above when using a thoriated tungsten electrode. The smoothest bead is obtained when using an arc gap of from 20 to 25 mils which results in an arc voltage of 22 volts at 46 amperes welding current and a travel speed of 12 inches per minute.

When welding aluminum and its alloys in shielding atmospheres of argon or helium, the operation may be performed in a closed container filled with the desired gas. For convenience, however, it is more desirable to use a gas-arc torch which not only supports and supplies welding current to the electrode but also embodies means for supplying about the electrode and molten portions of the work a stream or jet of the desired gas. I have found that the jet flow of helium must be much greater than the jet flow of argon in order to establish desired welding conditions. This may be due to the higher specific heat and greater mobility of helium as compared with argon.

The nozzle construction of a gas-arc torch suitable for performing such an operation is illustrated in the accompanying drawing.

As illustrated in the drawing, a tungsten electrode 10 is held by the jaws of a spring collet 11 which is attached to the end of a copper tube 12. The electrode 10 may extend into tube 12 which constitutes means for supplying gas about the electrode and the molten portions of the work as well as means for supplying welding current to the electrode supported in collet 11.

Tube 12 is surrounded by an electrically insulating sleeve 13 which in turn is covered by a protecting sleeve 14 of some durable metal, such as iron or steel. A nozzle 15 is supported by frictional engagement with the end of tube 14 and provides a chamber enclosing the end of tube 13 and the collet 11 mounted thereon. Gas supplied through tube 11 flows into the chamber provided by nozzle 15 through a plurality of openings 16 in the end side walls of tube 12. This gas is discharged from the tip of nozzle 15 about the arcing terminal of electrode 10.

One terminal of a source of arc welding current is connected by a conductor 17 to tube 13 and the other terminal of the source of supply is connected by a conductor 18 to a work supporting table 19. The parts 20 to be welded are supported on this table 19 with their adjoining edges centered and extending lengthwise of a groove 21 provided in the top surface of the table. It is, of course, not necessary to provide the work support with a groove 21 but in order to secure desired penetration I find that it is preferable to have the adjoining edges of the work parts out of engagement with the support on which they are mounted.

The nozzle structure above described may form part of a machine by means of which it and the joint between the work parts mounted on table 19 are traversed relatively to one another. In each case in order to permit relative movement between the nozzle and the work parts, gas and electricity may be supplied to the gas-arc torch through flexible hose and welding cable connections.

When using a gas nozzle of the relative proportions illustrated in the drawing, and an electrode 1/8 inch in diameter which is adjusted as illustrated in accordance with these proportions, I have determined the following arc volts-arc length characteristics when welding aluminum sheets of .048" in thickness with a direct current of about 55 amperes at travel speeds of about 8 inches per minute: In argon with a gas flow of about 9 cubic feet per hour, the arc volts vary from about 16 volts for a 40 mil gap to about 17 volts for a 150 mil gap to about 19.5 volts for a 300 mil gap. A thoriated tungsten electrode has a slightly different characteristic varying from about 15.5 volts for a 40 mil gap to about 18.5 volts for a 150 mil gap to about 21.5 volts for a 300 mil gap. In helium with a gas flow of about 40 cubic feet per hour, the characteristics for both tungsten and thoriated tungsten electrodes is substantially linear varying from about 29.5 volts for a 40 mil gap to about 37 volts for a 250 mil gap.

When using an alternating current of about 55 amperes in argon with flows of about 9 cubic feet per hour, the arc volts-arc length characteristic for a tungsten electrode varies from about 14.5 volts for a 40 mil gap to about 15.5 volts for a 150 mil gap to about 21 volts for a 250 mil gap. With a thoriated tungsten electrode the variation is from about 13 volts for a 40 mil gap to about 16.5 volts for a 150 mil gap to about 23 volts for a 250 mil gap. With a tantalum electrode the variation is from about 14.5 volts for a 40 mil gap to about gap to about 15.5 volts for a 40 mil gap to about 15.5 volts for a 75 mil gap and thereafter linearly to about 22.5 volts for a 200 mil gap. In helium at gas flows of about 40 cubic feet per hour, the corresponding alternating current characteristic for a tungsten electrode varies from about 31 volts for a 40 mil gap to about 39 volts for a 200 mil gap to about 48 volts for a 300 mil gap. The corresponding characteristic for a thoriated tungsten electrode varies from about 23 volts for a 40 mil gap to 31 volts for an 80 mil gap to about 41 volts for a 200 mil gap. Under like circumstances with a tantalum electrode the characteristic varies substantially linearly from 28 volts for a 40 mil gap to 43 volts for a 300 mil gap.

The arc volts-gas flow characteristics for a 55 ampere arc with an arc gap of about 40 mils are as follows: With direct current and the electrode connected to the positive terminal thereof the characteristics in argon for a tungsten electrode varies from about 15.5 volts for a flow of 2 cubic feet per hour to 14 volts for a flow of about 5 cubic feet per hour and thereafter increases to about 20 volts for a gas flow of 25 cubic feet per hour. With a thoriated tungsten electrode the arc voltage is about 16 volts for a gas flow of 2 cubic feet per hour, decreases to about 14.5 volts for a gas flow of 4 cubic feet per hour and thereafter increases to about 20 volts for a gas flow of 25 cubic feet per hour. The direct current arc in helium for a positive tungsten electrode operates at about 26 volts for a gas flow of 10 cubic feet per hour, thereafter increases to about 27 volts for a gas flow of about 40 cubic feet per hour and then decreases to about 25 volts for a gas flow of about 80 cubic feet per hour. Under like circumstances, with a thoriated tungsten electrode for gas flows of about 13 cubic feet per hour the voltage is 26 volts and thereafter increases to 27 volts for gas flows of about 27 cubic feet per hour and remains constant thereafter for gas flows up to 80 cubic feet per hour.

The alternating current arc in argon with a tungsten electrode has the following arc volts-gas flow characteristics: For gas flows of about 1 cubic foot per hour, the arc voltage is about 18 volts and decreases to about 14 volts for a gas flow of 9 cubic feet per hour and thereafter remains substantially constant for gas flows up to 24 cubic feet per hour. Under like circumstances a thoriated tungsten and a tantalum electrode give a characteristic which is substantially the same. In helium for varying gas flows the voltage of the alternating current arc for both a tungsten and a thoriated tungsten electrode remains substantially the same being about 35 to 37 volts. It is quite difficult to determine this characteristic because of the voltage variations of the arc in a helium atmosphere.

When using alternating current for welding .048" aluminum sheets with a 1/8 inch tungsten electrode in argon at gas flows of about 10 cubic feet per hour and travel speeds at about 8 inches per minute, it has been found that the arc voltage for an arc gap of 40 mils increases from 11.5 volts at 79 amperes to 17 volts at 20 amperes. At welding currents between 43 and 20 amperes, the bead is covered by a center band of dark gray dross. When this dross is removed from the weld by means of a wire brush or the like the surface of the weld is found to have a bright appearance. At current values of 48 amperes and lower, penetration does not extend through the aluminum sheet. Substantially the same results were obtained when using a thoriated tungsten electrode under the same conditions. The above observations were made when welding with a source having an open circuit voltage of about 310 volts.

Under like circumstances, when welding with direct current in argon with a tungsten electrode connected to the positive terminal of the source of supply, the arc voltage is about 15 volts for current values ranging from 73 to 31 amperes. At values of 64 amperes the center of the weld is discolored and this discoloration increases in amount at 73 amperes. At current values of 54 and 48 amperes a clean, bright bead is obtained. At lower current values the surface of the bead becomes milky and at 31 amperes dross begins to form a mottled design on the surface of the weld. Penetration does not extend through the sheet at 31 amperes current flow. At 22 to 25 amperes current flow the arc wanders giving voltages of from 15 to 17.5 volts and the surface is mottled with slag formation.

When welding in helium at flows of about 40 cubic feet per hour with alternating current having an open circuit value of about 315 volts under conditions otherwise the same as those specified above for argon, the arc voltage increases from 29 volts to 43 volts as the current decreases from 65 amperes to 19 amperes. With current values of from 19 to 23 amperes, the weld bead is rough and mottled with brown to black slag and penetration through the plate is not obtained until the current flow reaches the higher of these values. At current flows of from 29 to 39 amperes, the weld bead is bright but covered with a trace of dark gray slag. At still higher current values this dross increases until at 62 amperes it covers the bead. As would be expected penetration increases with increase of current.

When welding with direct current in helium at gas flows of 40 cubic feet per hour with a tungsten electrode connected to the positive terminal of the source of supply and with conditions otherwise the same as those specified above for argon, the arc voltage remains substantially constant at 28 to 29 volts for current flows of 67 to 27 amperes. The weld bead has its best surface appearance at current values of 45 and 40 amperes. Above these values the surface of the weld is coated with films that vary from brown-gray through rainbow colors to a violet-blue. At currents below these values the surface of the weld is rough with a gray-black slag covering. Penetration increases with current but in each case extends through the sheets for the entire range of current values tested. Like results are obtained when substituting a thoriated tungsten electrode for the tungsten electrode. With the thoriated tungsten electrode, best surface conditions are obtained at a welding current value of 47 amperes.

The above recited volt-ampere characteristics of the arc in argon and in helium indicate that for a range of current values at a given travel speed, it is necessary to use an electrode of the proper size. When the electrode size is suited to the current values and travel speed used, good welding conditions are established and good welds are produced. When the current values are less than those productive of good welding with a given size electrode, it would appear that good welding conditions will be again established if the travel speed is reduced.

When welding aluminum and its alloys in atmospheres of argon or helium, it may be that the ever present oxide formations on such metals account for the above described behavior of the welding arc. When welding with direct current it is my belief that when the electrode is negative, the negatively charged tungsten vapor in the arc deposits out as a thin tungsten film on the positive aluminum plate causing the black deposit noted. It may be that this thin layer of tungsten in conjunction with the oxides on the aluminum causes the arc to operate in a manner unsatisfactory for welding. As previously noted, this black deposit forms a sort of skin under which the metal is rendered molten but due to which a desired bead is prevented from forming along the arcing side of the work parts.

When welding with alternating current I have discovered, by means of the magnetic oscillograph, that at those voltages which are unsatisfactory for welding, the arc in argon and in helium exercises a decided rectifier action on the current flow. The direct current component of current flow is from the aluminum plate to the tungsten electrode, that is, in the direction previously found unsatisfactory for welding with direct current. With a 68 volt alternating current source I have discovered that complete rectification occurs and that the time during which current flows is greater than the time during which current does not flow. When current is not flowing, the voltage wave apparently attains a magnitude equal to the open circuit voltage. When current is flowing the voltage curve attains a much lower value and is dome-shaped with a horn or peak at its leading end. When, however, the open circuit voltage is increased to some value such as 200 volts for argon, alternating current flows in both directions there being, however, a direct current component flowing from the aluminum plate to the tungsten electrode. Under such circumstances when alternating current flow is at a minimum, the voltage wave is generally rectangular in shape with a central dome-shaped portion and when the alternating current flow is at a maximum the wave shape is substantially sinusoidal.

It may be that the oxide film on aluminum causes or is responsible in part for this rectifier action. Thus as in an aluminum electrolytic rectifier, current flow for a given voltage is greater from the electrolyte to the film on the aluminum electrode than from this film to the electrolyte, it may be that the same phenomenon occurs in the gas shielded arcing circuit between the film on the aluminum and the aluminum surface on which this film is formed or already present, for again current flow for a given voltage is greater from the aluminum to the film than in the reverse direction. This would also account for the fact that with direct current the arc voltage is greater and the current less for a given voltage when the electrode is positive than when the electrode is negative. I have also observed that the arc voltage of a direct current arc is less steady when the electrode is positive than when the electrode is negative. This could be explained by the above which also explains the tendency of the cathode spot in aluminum to lag behind the positive electrode as it is traversed along an aluminum work part.

By using an oscilloscope to study the alternating current arc in argon and in helium, I have found that whenever triangular wave shapes having a large maximum value are obtained, welding conditions are unsatisfactory, and whenever the open circuit voltage of the alternating current source is increased sufficiently to obtain satisfactory welding conditions, these triangular wave shapes become substantially rectangular. The above referred to triangular and rectangular voltage wave shapes occur during those half cycles when the aluminum is negative. When the aluminum is positive, the voltage wave shape is substantially that of a sinusoidal wave although at times it also approximates a rectangular shape. In any case the voltage wave when the aluminum is negative is not as wide as when the aluminum is positive. In helium the wave shapes may have widths when the aluminum is positive which are about one and one-half times that obtained when the aluminum is negative. Frequently, when the aluminum is negative the wave shapes have horns extending above the body portion of the wave at its leading and trailing ends.

By using alternating current and direct current meters of the magnetic type in order to determine conditions in the arc when welding aluminum in argon with alternating current at gas flows of 10 cubic feet per hour I have found that with an open circuit voltage of about 111 volts and an alternating current flow of about 55 amperes, the direct current flow was about 42 amperes from the aluminum plate to the tungsten electrode. Under these conditions the alternating current voltage of the arc was about 36 volts and its direct current voltage was about 3.5 volts with the tungsten electrode being positive. When, however, the open circuit voltage was increased to about 300 volts, under like circumstances for a 55 ampere alternating current flow, the direct current component was about 17 amperes. Under these conditions the alternating current voltage of the arc was about 14 volts and the direct current voltage of the arc was about 1.7 volts with the electrode positive.

A like determination of the characteristics of the alternating current arc in helium at gas flows of about 40 cubic feet per hour give similar results. In helium when the open circuit voltage was insufficient to maintain a desired welding arc for an alternating current flow of 55 amperes, the direct current flow was about 40 amperes, the alternating current voltage of the arc was about 56.5 volts, and the direct current voltage of the arc was about 3.5 with the tungsten electrode positive. However, when operating with a desirable open circuit voltage for the same alternating current flow of 55 amperes in the arc, the direct current was reduced to about 24 amperes. Under these conditions the alternating current voltage of the arc decreased to about 36 volts and the direct current voltage of the arc to about 2.5 volts.

It would thus appear that when insufficient open circuit alternating current voltage is employed, the flow of rectified current from the aluminum plate to the tungsten electrode is sufficient to produce the undesirable results noted when welding with direct current when the electrode is connected to the negative terminal of the source. If, however, the open circuit voltage of the alternating current source is sufficiently increased, the rectifier action of the arc in argon or in helium is decreased sufficiently to decrease the undesirable flow of rectified direct current to a value which will not interfere with the formation of a good weld.

The rectifier action of an alternating current arc in argon and in helium was also found to exist when welding other metals and is, consequently, not peculiar to aluminum and its alloys. Thus when welding low carbon steel with an argon shielded arc I have found that with a direct current source of supply better welding conditions are established if the tungsten electrode is connected to the positive terminal of the source of supply. When the tungsten electrode is connected to the negative terminal of the direct current source of supply, the arc has a tendency to wander whereas when the electrode is connected to the positive terminal this tendency to wander is eliminated. As is the case when welding aluminum, the arc voltage when welding low carbon steel is higher when the electrode is positive than when the electrode is negative. For a 40 mil arc gap it has been found that the arc voltage is about 15 volts when the electrode is positive whereas the arc voltage is about 13 volts when the electrode is negative. When using an alternating current source of supply having an open circuit voltage of 111 volts, I have found that in argon at 10 cubic feet per hour of gas flow, the arc between a tungsten electrode and a low carbon steel work part had a 42 ampere direct current component when the alternating current flow was 55 amperes. Under these conditions the arc voltage for a 40 mil gap was 38 volts alternating current and 3.5 direct current volts with the electrode positive. Under these conditions the welding bead had much the same appearance as when welding with a direct current source when the tungsten electrode was connected to the negative terminal thereof. However, when the open circuit voltage of the alternating current source was increased to 330 volts, the direct current component was reduced to 14 amperes when the alternating current flow was 56 amperes. Under these higher open circuit voltage conditions the alternating current voltage of the arc was about 10 volts and the direct current component 2.6 volts with the electrode positive. With this higher open circuit voltage the welding conditions more nearly approximated those obtained when welding with direct current with the electrode positive.

Another example of this rectifier action has been noted when welding magnesium. For example, when welding magnesium in argon at gas flows of about 10 cubic feet per hour and using an alternating current source having an open circuit voltage of 111 when the alternating current was 55 amperes there was a 43 ampere direct current component. Under these conditions the alternating current arc voltage was 33 and the direct current voltage was 3.5 with the electrode positive. When the open circuit voltage was increased to 298 volts and the alternating current amperes of the arc were 55, the direct current amperes decreased to 16.5. Under these conditions the alternating current voltage of the arc was 11 and the direct current voltage was 1.5 with the electrode positive. Magnesium, however, is not very critical to direction of current flow and, consequently, satisfactory welds were obtained at both of the above recited open circuit voltages of the alternating current source. It is to be noted, however, that when welding magnesium with direct current it is preferable to operate with the tungsten electrode connected to the positive terminal of the source of supply in order to reduce the amount of heat produced in the work by the arc.

Similar rectifier conditions have been obtained when welding stainless steel, Monel, copper and brass with the alternating current arc in argon and in helium.

For welding aluminum in either argon or helium, the use of a carbon electrode was found not to be conducive to the formation of good welds with either alternating or direct current sources of supply. Best conditions were obtained, however, when welding in helium with a 40 mil arc gap when the open circuit voltage was 460 and the gas flow was about 10 cubic feet per hour. In argon similar results were obtained with an alternating current source having an open circuit voltage of 327 volts when the gas flow was about 20 cubic feet per hour. In each of these cases the weld bead was covered with a gray coating of what appeared to be slag or dross. The arc volts-gas flow characteristic with alternating current when using a carbon electrode was found to be substantially linear in helium giving about a 27.5 volt arc for gaps of 40 mils. In argon at 12 cubic feet per hour gas flow, the arc voltage was 18, increased to an arc voltage of about 22.5 for gas flows of about 20 cubic feet per hour and thereafter decreased to about 22 volts for gas flows of 24 cubic feet per hour. It will be noted that this characteristic in argon is different from that obtained when using tungsten, thoriated tungsten or tantalum electrodes in the same gas.

In view of the desirable results obtained by increasing the magnitude of the open circuit voltage when welding with alternating current it is, of course, obvious that the same desirable results will be obtained when superimposing a high frequency source of sufficiently high voltage across an arc fed from a source of alternating welding current having an open circuit voltage which in itself is inadequate for accomplishing the desired results. It is likewise apparent that by using gas-arc nozzles having constructions different from that illustrated and described above that the characteristics recited above may vary slightly. Furthermore, these characteristics will not be obtained if the argon or helium used is not of high purity. For example, it was found that slight impurities in the gas line when using helium would cause the arc to behave very erratically. In one case, contamination through an opening of pin hole size in the side wall of the gas nozzle made it impossible to duplicate results previously obtained until after this leak had been located and repaired.

In view of the above description of my invention, modifications and applications thereof other than those considered above will occur to those skilled in the art to which it relates. I, therefore, aim to cover by the appended claims all such modifications and adaptations of my invention as fall within the true spirit and scope thereof.

What I claim as new and desire to secure by Letters Patent of the United States is:

1. The method of fusing a metal with an arc established between said metal and a substantially non-consumable metallic electrode selected from the group consisting of tungsten, thoriated tungsten, and tantalum which comprises the steps of supplying about said arc and the portions of said metal rendered molten thereby, a gas selected from the group consisting of argon and helium, and energizing said arc from a source of alternating current having an open circuit voltage greater than that voltage at or below which complete rectification of current flow through said arc occurs, said open circuit voltage being great enough to cause current flow in both directions through said arc.

2. The method of producing a fusion weld between metal parts which comprises establishing an arc between said parts and an electrode selected from the group consisting of tungsten, thoriated tungsten, and tantalum, traversing said arc and said metal parts relatively to one another along a desired line of fusion, supplying about the arc and the portions of said metal parts rendered molten thereby a gas selected from the group consisting of argon and helium, and energizing said arc from a source of alternating current having an open circuit voltage greater than a predetermined value above which, for a predetermined arc gap, the arc voltage, measured with an alternating current meter of the magnetic type, abruptly changes to a value about half that obtained when employing a source of open circuit voltage less than said predetermined value.

3. The method of producing a fusion weld between metal parts which comprises establishing an arc between said parts and an electrode selected from the group consisting of tungsten, thoriated tungsten, and tantalum, traversing said arc and said metal parts relatively to one another along a desired line of fusion, supplying about the arc and the portions of said metal parts rendered molten thereby a shielding gas selected from the group consisting of argon and helium, and energizing said arc from a source of alternating current having an open circuit voltage greater than that voltage at or below which complete rectification of current flow through the arc occurs and, for an arc gap of about 40 mils, the arc voltage, when measured with an alternating current meter of the magnetic type, is of the order of 27 to 32 volts for the argon shielded arc and of the order of 60 to 80 volts for the helium shielded arc and above which current flows in both directions through the arc and, for an arc gap of about 40 mils, the arc voltage when measured with an alternating current meter of the magnetic type, is of the order of 13 to 15 volts for the argon shielded arc and of the order of 25 to 36 volts for the helium shielded arc.

4. A method of forming a bright bead of fused metal between parts of aluminum and aluminum alloys having the oxidizing characteristics of aluminum which comprises establishing an arc between said parts and an electrode selected from the group consisting of tungsten, thoriated tungsten, and tantalum, traversing said arc and said metal parts relative to one another along a desired line of fusion, supplying about the arc and the portions of said metal parts rendered molten thereby a gas selected from the group consisting of argon and helium, and energizing said arc from a source of alternating current having an open circuit voltage greater than that voltage at or below which a narrow groove-like arc crater track coated with a black scum-like surface is formed in the portions of said parts rendered molten by the arc.

5. The method of fusing welding parts of aluminum and aluminum alloys having the oxidizing characteristics of aluminum with an arc established between said parts in a substantially non-consumable metallic electrode selected from the group consisting of tungsten, thoriated tungsten, and tantalum which comprises the steps of supplying about said arc and the portions of said parts rendered molten thereby a shielding gas selected from the group consisting of argon and helium, fusing said parts with an arc established from a source of alternating current having an open circuit voltage which in itself is incapable of causing current to flow in both directions through the arc, and superimposing across said arc a high frequency source of sufficiently high open circuit voltage to cause current to flow in both directions through said arc.

6. A method of welding parts of aluminum and aluminum alloys having the oxidizing characteristics of aluminum which comprises establishing an arc between said parts and an electrode selected from the group consisting of tungsten, thoriated tungsten, and tantalum, traversing said arc and said parts relative to one another along a desired line of fusion, supplying about the arc and the portions of said metal parts rendered molten thereby a shielding atmosphere of argon, and energizing said arc from a source of alternating current having an open circuit voltage greater than a predetermined value at or below which complete rectification of current flow through the arc occurs and above which current flows in both directions through the arc, said predetermined value of open circuit voltage being greater than 145 volts and preferably greater than 200 volts.

7. A method of welding parts of aluminum and aluminum alloys having the oxidizing characteristics of aluminum which comprises establishing an arc between said parts and an electrode selected from the group consisting of tungsten, thoriated tungsten and tantalum, traversing said arc and said parts relative to one another along a desired line of fusion, supplying about the arc and the portions of said metal parts rendered molten thereby a shielding atmosphere of argon, and energizing said arc from a source of alternating current having an open circuit voltage greater than 200 volts.

8. A method of welding parts of aluminum and aluminum alloys having the oxidizing characteristics of aluminum which comprises establishing an arc between said parts and an electrode selected from the group consisting of tungsten, thoriated tungsten and tantalum, traversing said arc and said parts relative to one another along a desired line of fusion, supplying about the arc and the portions of said metal parts rendered molten thereby a shielding atmosphere of helium, and energizing said arc from a source of alternating current having an open circuit voltage greater than 380 volts.

RICHARD F. WYER.

REFERENCES CITED

The following references are of record in the file of this patent:

UNITED STATES PATENTS

| Number | Name | Date |
|---|---|---|
| 1,570,803 | Walker | Jan. 26, 1926 |
| 1,902,469 | Seede | Mar. 21, 1933 |
| 2,021,477 | Bohn | Nov. 19, 1935 |
| 2,173,450 | Larsen et al. | Sept. 19, 1939 |
| 2,314,628 | Pavlecka | Mar. 23, 1943 |

OTHER REFERENCES

Doan et al., "Arc Welding Atmospheres", The Welding Journal, June 1938. Pages 1–4 of the Welding and Research Supplement.

Wassell, "Characteristics of Welding Arcs on Aluminum in Atmospheres of Helium and Argon", The Welding Journal, October 1944. Pages 487–S through 493–S.